(12) United States Patent
Szczesny et al.

(10) Patent No.: US 6,534,949 B2
(45) Date of Patent: Mar. 18, 2003

(54) MOTOR DRIVE CONVERTER AND METHOD WITH NEUTRAL POINT DRIFT COMPENSATION

(75) Inventors: Paul Michael Szczesny, Ballston Lake, NY (US); Nikola Celanovic, Baden-Battwil (CH); James Patrick Lyons, Niskayuna, NY (US); Vlatko Vlatkovic, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/822,303

(22) Filed: Mar. 29, 2001

(65) Prior Publication Data

US 2002/0172058 A1 Nov. 21, 2002

(51) Int. Cl.$^7$ ............................................. H02M 7/5387
(52) U.S. Cl. ...................... 318/801; 363/133; 363/134
(58) Field of Search ............................... 318/722, 801; 363/34, 35, 37, 40, 41, 131–139

(56) References Cited

U.S. PATENT DOCUMENTS

| | | | |
|---|---|---|---|
| 5,155,675 A | | 10/1992 | Maruyama et al. |
| 5,355,297 A | | 10/1994 | Kawabata et al. |
| 5,361,196 A | | 11/1994 | Tanamachi et al. |
| 5,506,765 A | * | 4/1996 | Nakata et al. ................. 363/98 |
| 5,621,628 A | * | 4/1997 | Miyazaki et al. ............. 363/37 |
| 5,627,742 A | * | 5/1997 | Nakata et al. ................. 363/98 |
| 5,910,892 A | | 6/1999 | Lyons et al. |
| 6,288,921 B1 | * | 9/2001 | Uchino et al. ............... 363/132 |
| 6,333,569 B1 | * | 12/2001 | Kim ............................. 307/31 |

OTHER PUBLICATIONS

Nikola Celanovic, et al, "A Comprehensive Study of Neutral–Point Voltage Balancing Problem in Three–Level Neutral–Point–Clamped Voltage Source PWM Inverters", IEEE Trans on Power Electronics, vol. 15, No. 2, Mar. 2000, pp. 242–249.

Hyo Liu, et al, "Three–Level Space Vector PWM in Low Index Modulation Region Avoiding Narrow Pulse Problem", IEEE Trans on Power Electronics, vol. 9, No. 5, Sep. 1994, pp. 481–486.

Akira Nabae, et al, "A New Neutral–Point–Clamped PWM Inverter", IEEE Trans on Industry Applications, vol. 1A–17, No. 5, Sep./Oct. 1981, pp. 518–523.

C. Newton, et al, "Neutral Point Control For Multi–Level Inverters: Theory, Design and Operational Limitations", 1997 IEEE, pp. 1336–1343.

Satoshi Ogasawara, et al, "A Vector Control System Using a Neutral–Point–Clamped Voltage Source PWM Inverter", 1991 IEEE, pp. 422–427.

Roberto Rojas, et al, "An Improved Voltage Vector Control Method for Neutral–Point–Clamped Inverters", IEEE Trans. on Power Electronics, vol. 10, No. 6, Nov. 1995, pp. 666–672.

Jurgen K. Steinke, "Switching Frequency Optimal PWM Control of a Three–Level Inverter", IEEE Trans on Power Electronics, vol. 7, No. 3, Jul. 1992, pp. 487–496.

* cited by examiner

*Primary Examiner*—Bentsu Ro
(74) *Attorney, Agent, or Firm*—Ann M. Agosti; Patrick K. Patnode

(57) ABSTRACT

A high power motor drive converter comprises: a three level neutral point clamped (NPC) output power conversion stage including switches for supplying power to an AC drive motor; a split series connected DC capacitor bank coupled in parallel with the NPC output power conversion stage; and a controller for selecting switch positions for controlling the NPC output power conversion stage and compensating for a neutral point voltage imbalance of the DC capacitor bank by adjusting amplitudes of carrier voltages according to an amount of voltage imbalance in the split series connected DC capacitor bank.

18 Claims, 7 Drawing Sheets

EFFECT OF THE ERROR IN NP VOLTAGE TO THE MEDIUM VOLTAGE VECTORS

|  | pon | opn | npo | nop | onp | pno |
|---|---|---|---|---|---|---|
| $V_{ab}$ | $V_{dc}/2-\Delta V$ | $-V_{dc}/2+\Delta V$ | $-V_{dc}$ | $-V_{dc}/2-\Delta V$ | $V_{dc}/2+\Delta V$ | $V_{dc}$ |
| $V_{bc}$ | $V_{dc}/2+\Delta V$ | $V_{dc}$ | $V_{dc}/2-\Delta V$ | $V_{dc}/2-\Delta V$ | $-V_{dc}$ | $-V_{dc}/2-\Delta V$ |
| $V_{ca}$ | $-V_{dc}$ | $-V_{dc}/2-\Delta V$ | $V_{dc}/2+\Delta V$ | $V_{dc}$ | $V_{dc}/2-\Delta V$ | $-V_{dc}/2+\Delta V$ |

*Fig. 8*

EFFECT OF THE ERROR IN NP VOLTAGE TO THE SMALL VOLTAGE VECTORS

|  | poo | ppo | opo | opp | oop | pop |
|---|---|---|---|---|---|---|
| $V_{ab}$ | $V_{dc}/2-\Delta V$ | 0 | $-V_{dc}/2+\Delta V$ | $-V_{dc}/2+\Delta V$ | 0 | $V_{dc}/2-\Delta V$ |
| $V_{bc}$ | 0 | $V_{dc}/2-\Delta V$ | $V_{dc}/2-\Delta V$ | 0 | $-V_{dc}/2+\Delta V$ | $-V_{dc}/2+\Delta V$ |
| $V_{ca}$ | $-V_{dc}/2+\Delta V$ | $-V_{dc}/2+\Delta V$ | 0 | $V_{dc}/2-\Delta V$ | $V_{dc}/2-\Delta V$ | 0 |

|  | onn | oon | non | noo | nno | ono |
|---|---|---|---|---|---|---|
| $V_{ab}$ | $V_{dc}/2+\Delta V$ | 0 | $-V_{dc}/2-\Delta V$ | $-V_{dc}/2-\Delta V$ | 0 | $V_{dc}/2+\Delta V$ |
| $V_{bc}$ | 0 | $V_{dc}/2+\Delta V$ | $V_{dc}/2+\Delta V$ | 0 | $-V_{dc}/2-\Delta V$ | $-V_{dc}/2-\Delta V$ |
| $V_{ca}$ | $-V_{dc}/2-\Delta V$ | $-V_{dc}/2-\Delta V$ | 0 | $V_{dc}/2+\Delta V$ | $V_{dc}/2+\Delta V$ | 0 |

*Fig. 9*

MOTOR DRIVE CONVERTER AND METHOD WITH NEUTRAL POINT DRIFT COMPENSATION

BACKGROUND

The invention relates generally to motor drive converters and more particularly to three-level neutral-point-clamped converters.

Conventional converters include electrical switches paired with diodes to accommodate inductive motor load currents. Three phase three level inverters have three phase legs with each leg having four switch and diode pairs spanning a DC bus and two clamping diodes. A controller is used for controlling each of the switches, and there are three command states for the switches per phase. By coupling clamping diodes between the DC capacitor bank midpoint (the neutral point) and pairs of the switches, the maximum DC working voltage across any switch is kept from exceeding about one half of the DC bus voltage.

Conventional techniques for providing voltage balance for the neutral point include, for example, sine triangle modulation by inserting zero-sequence voltage and space vector modulation by manipulating small vectors. Examples of these techniques are described in Steinke, "Switching Frequency Optimal PWM Control of a Three-Level Inverter," IEEE TRANSACTIONS ON POWER ELECTRONICS, Vol. 7, No. 3, 487–496, July 1992, and commonly assigned Lyons et al., U.S. Pat. No. 5,910,892. In such embodiments, the voltage balance in the neutral point can be achieved in a line cycle level. However, for certain loading conditions, significant charge flows in and out of the neutral point and can cause neutral point voltage ripple on multiples of the line frequency.

The conventional method for minimizing neutral point voltage ripple by increasing the DC link capacitance is expensive. It would therefore be desirable to minimize neutral point voltage ripple by a method that does not require increased DC link capacitance.

SUMMARY

Briefly, in accordance with one neutral point drift compensation embodiment of the present invention, a high power motor drive converter comprises: a three level neutral point clamped (NPC) output power conversion stage including switches for supplying power to an AC drive motor; a split series connected DC capacitor bank coupled in parallel with the NPC output power conversion stage; and a controller for selecting switch positions for controlling the NPC output power conversion stage and compensating for a neutral point voltage imbalance of the DC capacitor bank by adjusting amplitudes of carrier voltages according to an amount of voltage imbalance in the split series connected DC capacitor bank.

DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

FIGS. 8–9 are tables illustrating effects of voltage unbalance in the neutral point.

DESCRIPTION

Figure 1:
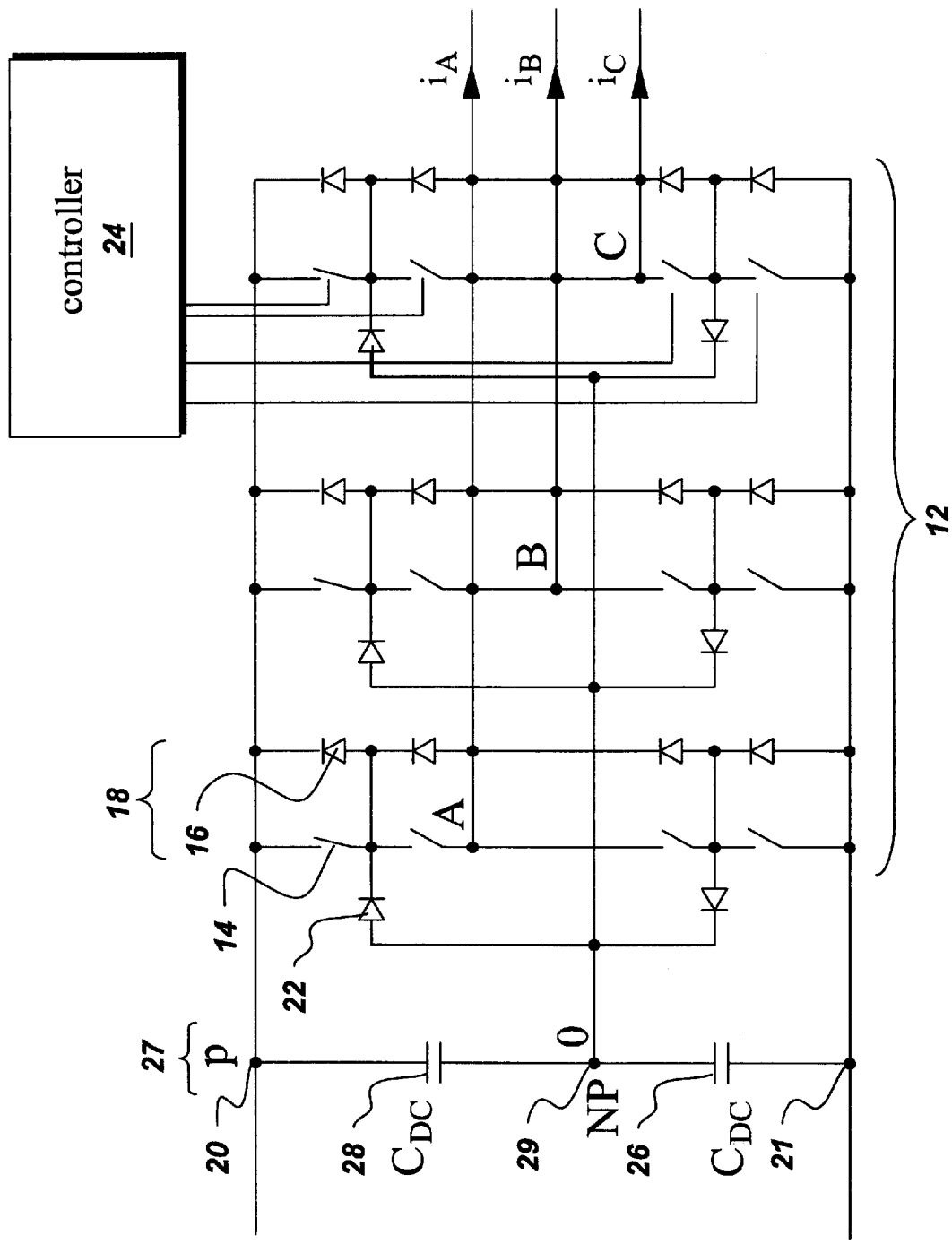
FIG. 1 is a circuit diagram of a conventional three-phase neutral-point-clamped converter.

FIG. 1 is a circuit diagram of a conventional neutral point clamped (NPC) converter 10 including a three level output power conversion stage 12. The output power stage includes electrical switches 14 which may comprise, for example, IGBTs (Insulated Gate Bipolar Transistors), GTOs (Gate Turn Off Thyristors), or IGCTs (Integrated Gate Commutated Thyristors). The switches are paired with diodes 16, which may comprise anti-parallel freewheeling diodes, for example, to accommodate inductive motor load currents. A controller 24 is used for controlling each of the switches. The controller comprises a computer and in a preferred embodiment includes a digital signal processor. Output power conversion stage 12 includes individual NPC three level phase legs 18. Each phase leg of the three phase inverter has four switch and diode pairs spanning the DC bus (with a DC bus positive rail 20 (p), a DC bus negative rail 21 (n), and a midpoint of the bus 29 (the neutral point)) and two clamping diodes 22.

As described in aforementioned Lyons et al., U.S. Pat. No. 5,910,892, there are three command states for the switches per phase. Depending on the switch commanded state per phase, and the instantaneous polarity of the load current in that phase, the load current path can be through switches, freewheeling diodes, or clamping diodes. DC link capacitors 26 and 28 of split series connected DC capacitor bank 27 are coupled in series across the DC bus at neutral point 29. By coupling the clamping diodes 22 between the capacitor bank midpoint and pairs of the switches, the maximum DC working voltage across any switch is kept from exceeding about one half of the DC bus voltage (Vdc/2), provided the capacitor bank midpoint voltage is maintained at Vdc/2.

Embodiments of the present invention can be used with software algorithms for sine triangle modulation (FIGS. 2–5) or space vector modulation (FIGS. 6–10). By applying algorithms of embodiments of the present invention (as in step 101 of FIG. 11. for example), a certain amount (depending on the voltage rating of the converter) of ripple in the neutral point can be compensated so as to minimize distortion in an output voltage waveform. Thus larger than average capacitors 26 and 28 are not required, and, in some embodiments, smaller than average capacitors can be used.

Figure 3:
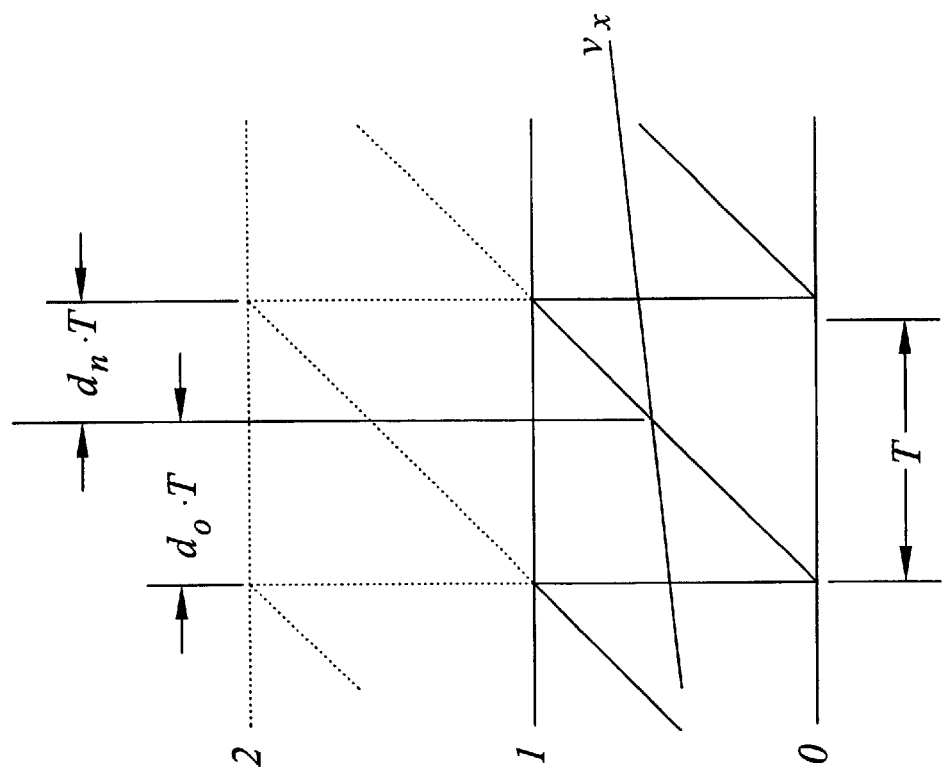
FIGS. 2–3 are graphs illustrating implementation of a sine triangle three level modulation.
Figure 2:
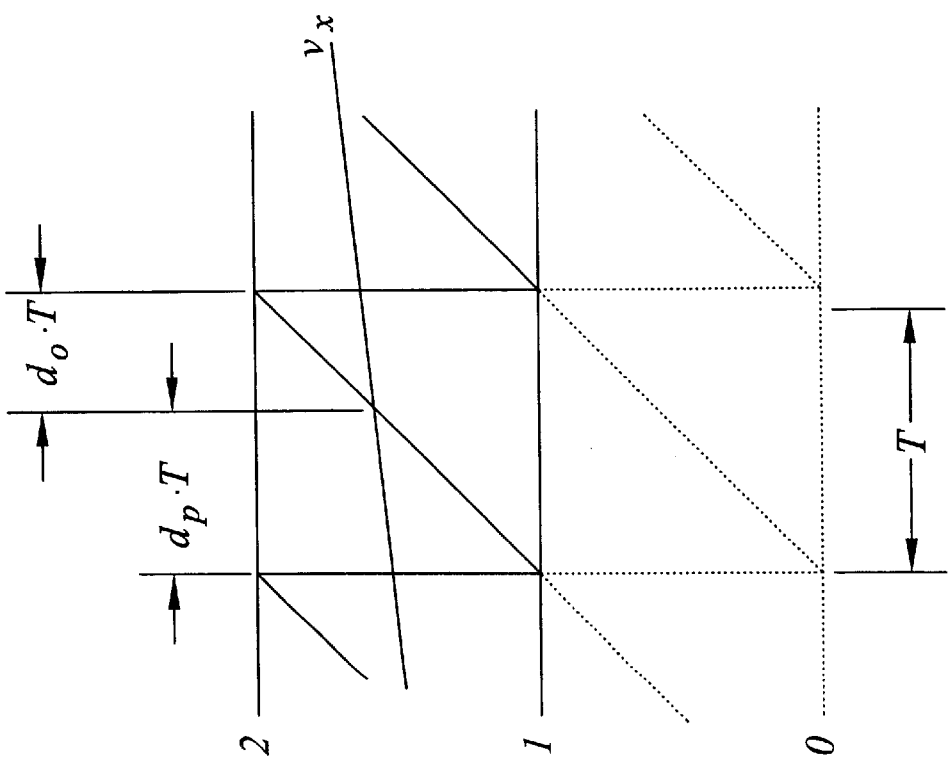

FIGS. 2–3 are graphs illustrating implementation of a sine triangle three level modulation. Although saw tooth shaped waveforms are shown in the embodiments of FIGS. 2–3 and FIGS. 4–5, the present invention is not limited to such waveforms. An alternative waveform, for example, is a triangle waveform.

In the embodiment of FIGS. 2–3, the modulating signals ($\upsilon v_a(t)$, $\upsilon_b(t)$, $\upsilon_c(t)$) for each phase are calculated (step 102 of FIG. 11) as follows:

$$v_a(t) = m \cdot \sin(\omega \cdot t) + m_0$$

$$v_b(t) = m \cdot \sin\left(\omega \cdot t - \frac{2 \cdot \pi}{3}\right) + m_0$$

$$v_c(t) = m \cdot \sin\left(\omega \cdot t + \frac{2 \cdot \pi}{3}\right) + m_0$$

wherein $\upsilon_a(t)$, $\upsilon_b(t)$, $\upsilon_c(t) \in [0,2]$, $m_0$ represents the zero sequence component, $\omega$ represents frequency, t represents time, and m represents the modulation index (the ratio between the desired amplitude of the output phase voltages and the maximum possible amplitude or undistorted of sinusoidal phase voltages that can be generated).

When the modulating signal of phase x (a, b, or c) is larger than one, the modulating signal $v_x(t)$ is compared with the upper triangular waveform, the output signal is switched to the positive rail 20 (FIG. 1) for the time $d_p \cdot T$, and to the neutral point 29 (FIG. 1) for the time $d_0 \cdot T$. The times can be calculated as follows:

$$<d_p(t)> = v_x(t) - 1$$

$$<d_0(t)> = 2 - v_x(t),$$

wherein where $<x(t)>$ denotes the function averaged over the switching cycle $T_s$, $$\langle x(t) \rangle = \frac{1}{T_s} \cdot \int_t^{t+T_s} x(\tau) \cdot d\tau.$$

When the modulating signal of phase x is less than one, the modulating signal $v_x(t)$ is compared with the lower triangular waveform, the output signal is switched to the neutral point 29 (FIG. 1) for the time $d_0 \cdot T$ and to the negative rail 21 (FIG. 1) for the time $d_n \cdot T$. The duty cycle times can be calculated as follows:

$$<d_0(t)> = v_x(t)$$

$$<d_n(t)> = 1 - v_x(t).$$

Under some circumstances, voltage balance in the capacitor bank cannot be maintained on a switching cycle level, and low frequency voltage ripple results in the neutral point. Because conventional modulation embodiments compute the duty cycles $d_p$, $d_0$, $d_n$, assuming the balanced DC capacitor bank 27 voltage, a distorted ac output waveform results in the presence of the voltage ripple.

Figure 5:
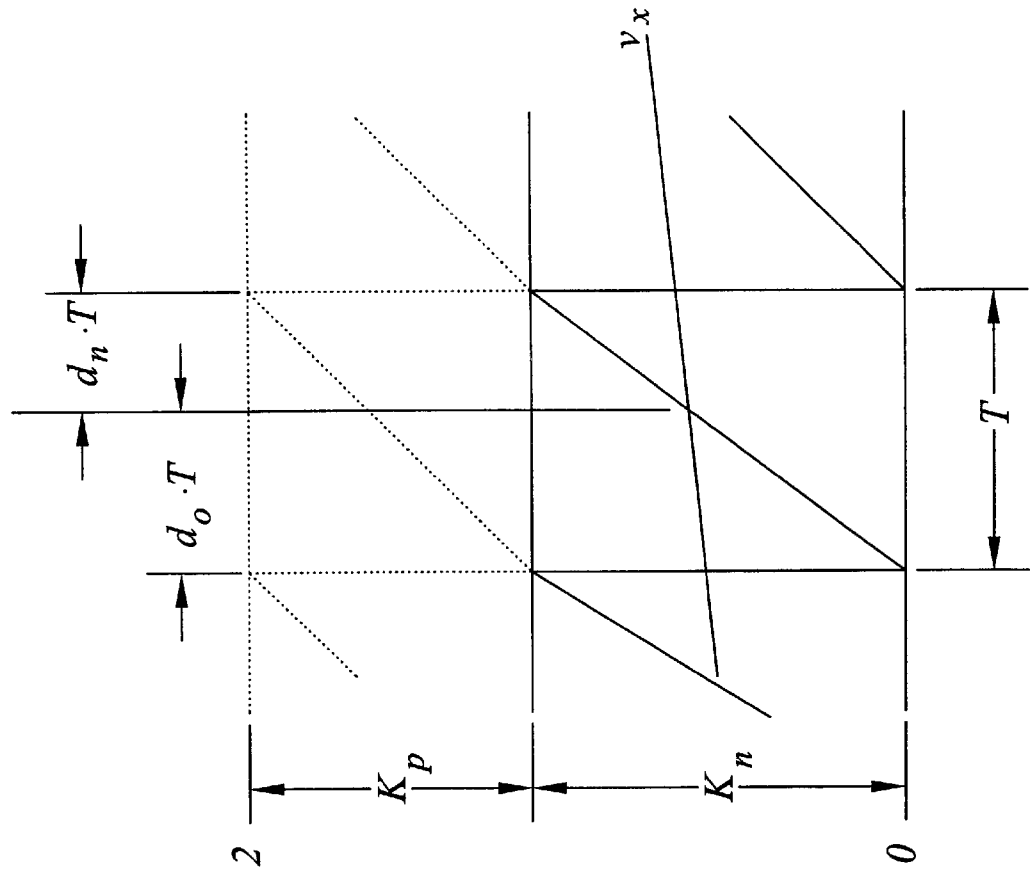
FIGS. 4–5 are graphs illustrating an implementation of a sine triangle three level modulation in accordance with one embodiment of the present invention.
Figure 4:
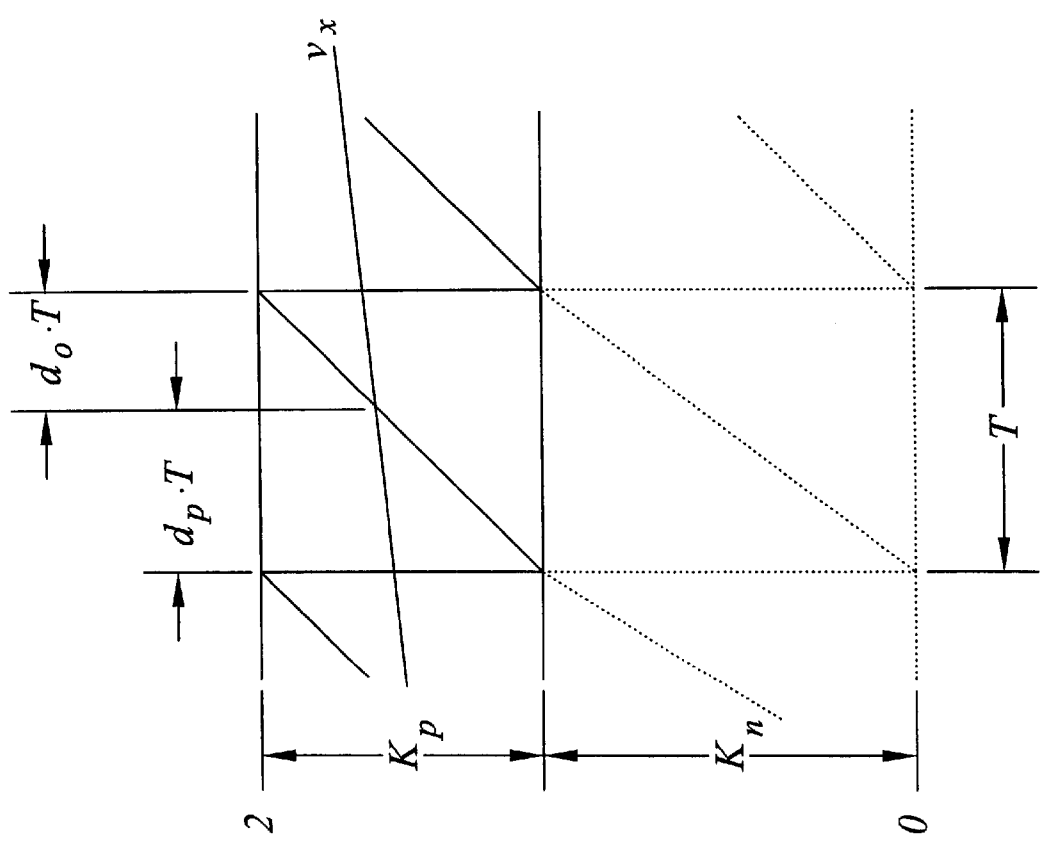

FIGS. 4–5 are graphs illustrating an implementation of a sine of a sine triangle three level modulation in accordance with one embodiment of the present invention wherein the amplitudes of the upper and lower triangular carrier are adjusted (step 103 of FIG. 11) according to the amount of voltage unbalance in the capacitors in a feed forward manner. In the embodiment of FIGS. 4–5, the amplitudes of the triangular carriers are adjusted according to the ratio of the split DC link voltages ($V_P$ and $V_n$) such that:

$$\frac{K_p}{K_n} = \frac{|V_p|}{|V_n|}$$

wherein $K_p + K_n = X$ and $|V_p| + |V_n| = V_{pn} = V_{dc}$, and wherein X represents a constant which in one example has a value of 2.

The zero sequence component, $m_0$ still regulates the voltage balance in the capacitors. The duty cycles can be obtained (steps 105 and 106 of FIG. 11) and expressed as $$\langle d_p(t) \rangle = \frac{v_x(t) - K_n}{K_p} \text{ and } \langle d_o(t) \rangle = \frac{2 - v_x(t)}{K_p} \text{ for } v_x(t) > K_n, \text{ and}$$

$$\langle d_o(t) \rangle = \frac{v_x(t)}{K_n}, \text{ and } \langle d_n(t) \rangle = \frac{K_n - v_x(t)}{K_n} \text{ for } v_x(t) < K_n.$$

Therefore, the average ac voltage of the phase x, referenced to the neutral point can be expressed as:

$$\langle v_{0x}(t) \rangle =$$

$$\begin{cases} \langle d_p(t) \rangle \cdot |V_p| = \frac{v_x(t) - K_n}{K_p} \cdot |V_p| = (v_x(t) - K_n) \cdot \frac{V_{dc}}{2} & \text{for } v_{ref}(t) > K_n \\ -\langle d_n(t) \rangle \cdot |V_n| = \frac{K_n - v_x(t)}{K_n} \cdot |V_n| = (v_x(t) - K_n) \cdot \frac{V_{dc}}{2} & \text{for } v_{ref}(t) < K_n \end{cases}$$

such that there are no discontinuities when the modulating signal crosses the $K_n$ boundary between upper and lower of the carrier waveform.

Figure 11:
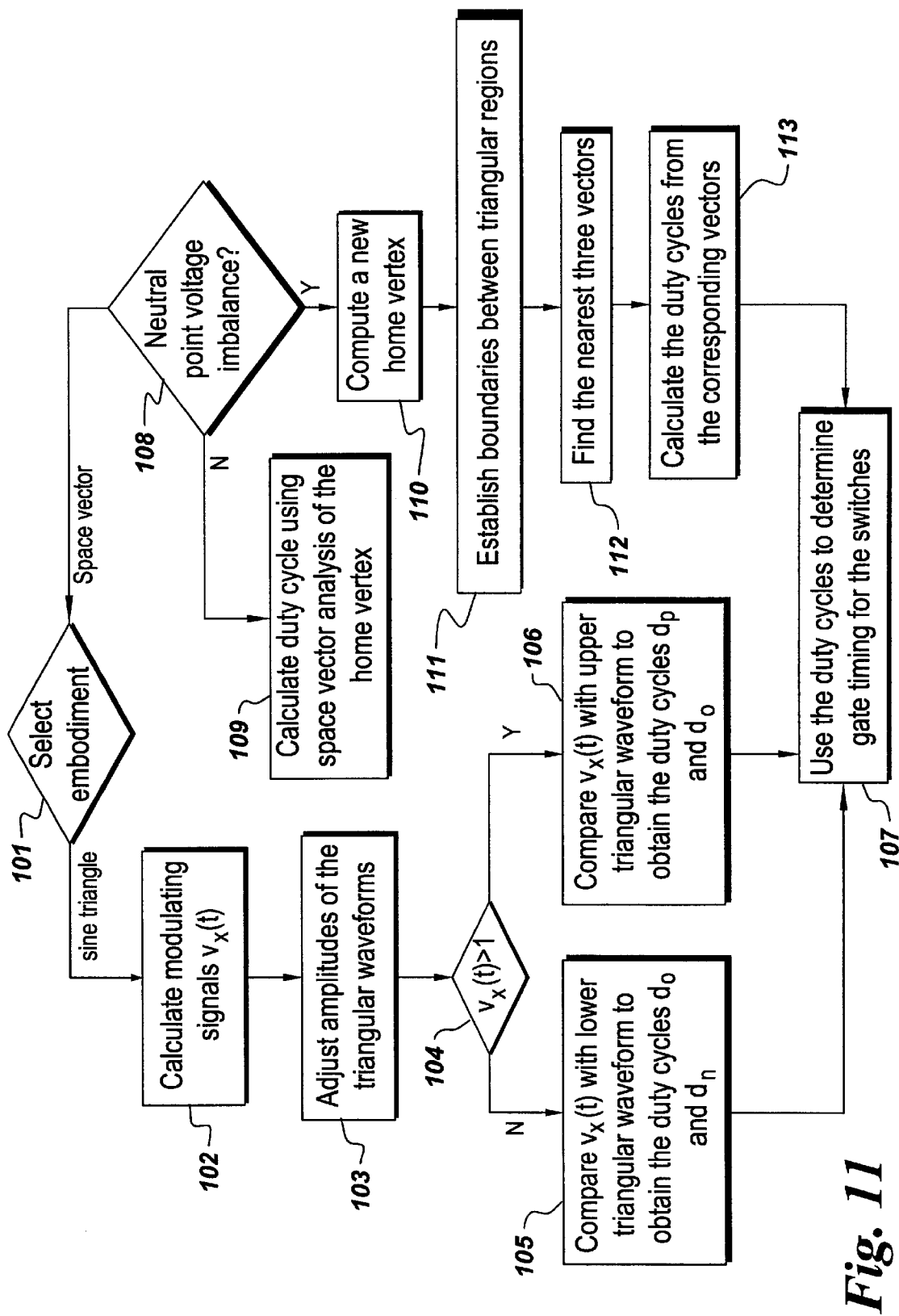
FIG. 11 is a flow chart illustrating several embodiments of the present invention.

As discussed above, when the modulating signal of phase x($v_{0x}(t)$) is larger than one (step 104 of FIG. 11), the modulating signal is compared with the upper triangular waveform, the output signal is switched to the positive rail 20 (FIG. 1) for the time $d_p \cdot T$, and to the neutral point 29 for the time $d_0 \cdot T$ (steps 105 and 107 of FIG. 11), and, when the modulating signal is less than one, the modulating signal is compared with the lower triangular waveform, the output signal is switched to the neutral point for the time $d_0 \cdot T$ and to the negative rail 21 for the time $d_n \cdot T$ (steps 106 and 107 of FIG. 11).

Figures 6, 7:
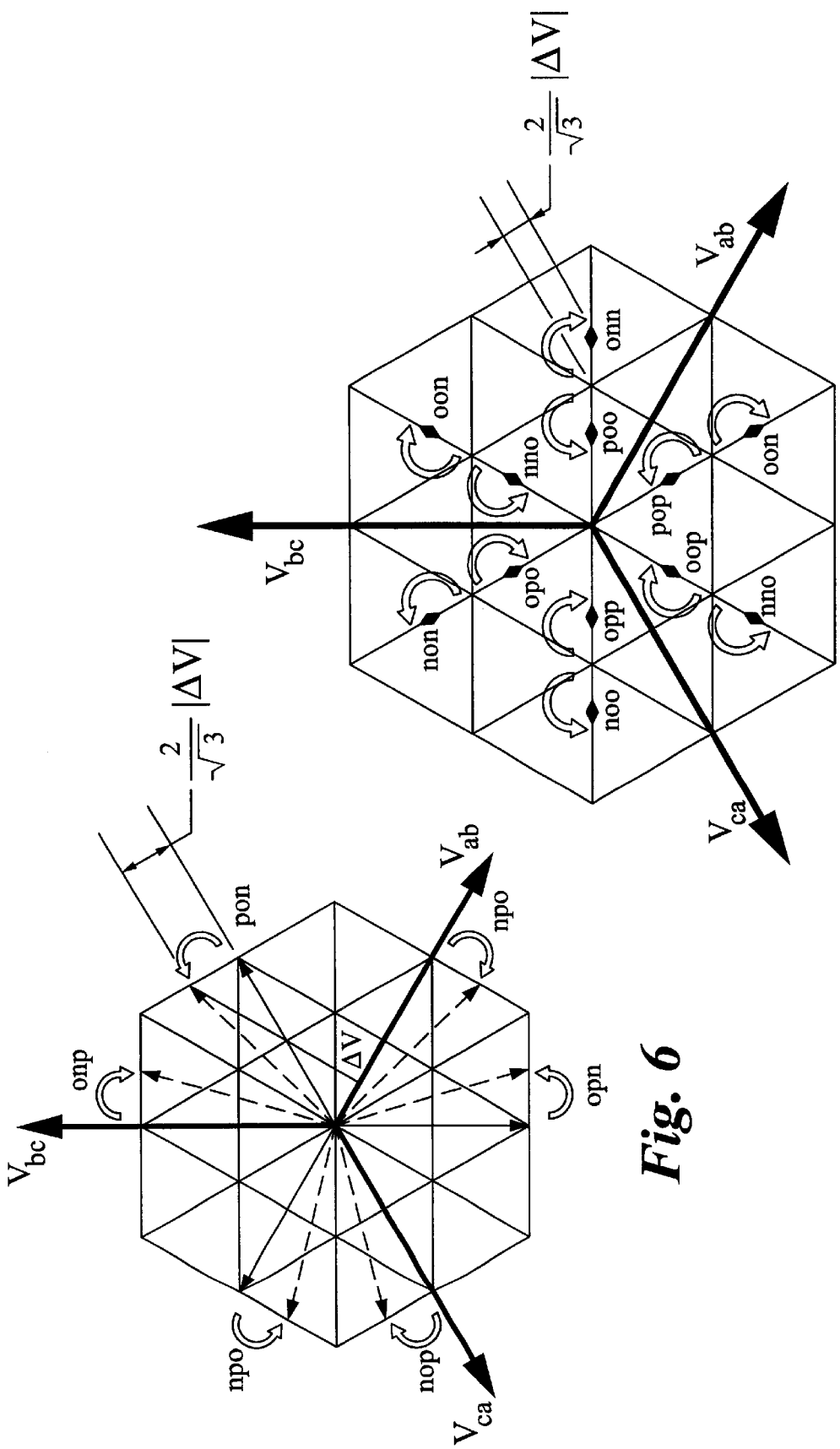
FIGS. 6–7 are space vector diagrams illustrating effects of voltage unbalance in the neutral point.

The space vector diagrams of FIGS. 6–7 and the tables of FIGS. 8–9 illustrate effects of voltage unbalance in the neutral point on the small and medium voltage vectors. The large vectors are generally unaffected by the neutral point voltage.

Aforementioned Lyons et al., U.S. Pat. No. 5,910,892, describes an example of a conventional technique for space vector modulation wherein a controller uses the modulation to control a magnitude and a rotation of a reference voltage vector in a complex voltage plane defined by orthogonal axes and phase voltages. The feed-forward algorithm for space vector modulation of the present invention can be used to supplement the embodiment of this patent as well as other conventional space vector modulation embodiments.

A modified space vector three-level modulation algorithm of this embodiment of the present invention computes the duty cycles of the voltage switching vectors based on the actual location of the voltage vectors, as opposed to conventional algorithms that do not take into account the fact that switching vectors change their position if there is voltage unbalance in the neutral point. In circumstances when there is no neutral point unbalance, the modified algorithm computes the same duty cycles as the conventional space vector modulation algorithms.

The majority of conventional multilevel space vector modulation algorithms control the neutral point voltage balance by manipulating the redundant small vectors. Typically the controller determines the ratio of time that each small vector in a pair is switched during the duty cycle of any given small vector. Similarly, the controller in the space vector modulation algorithm explained in aforementioned Lyons et al., U.S. Pat. No. 5,910,892, determines the relative dwell times between two small vectors of the home vertex $\vec{V}_0$, $\vec{V}_3$ and assumes that $\vec{V}_0 = \vec{V}_3$.

Figure 10:
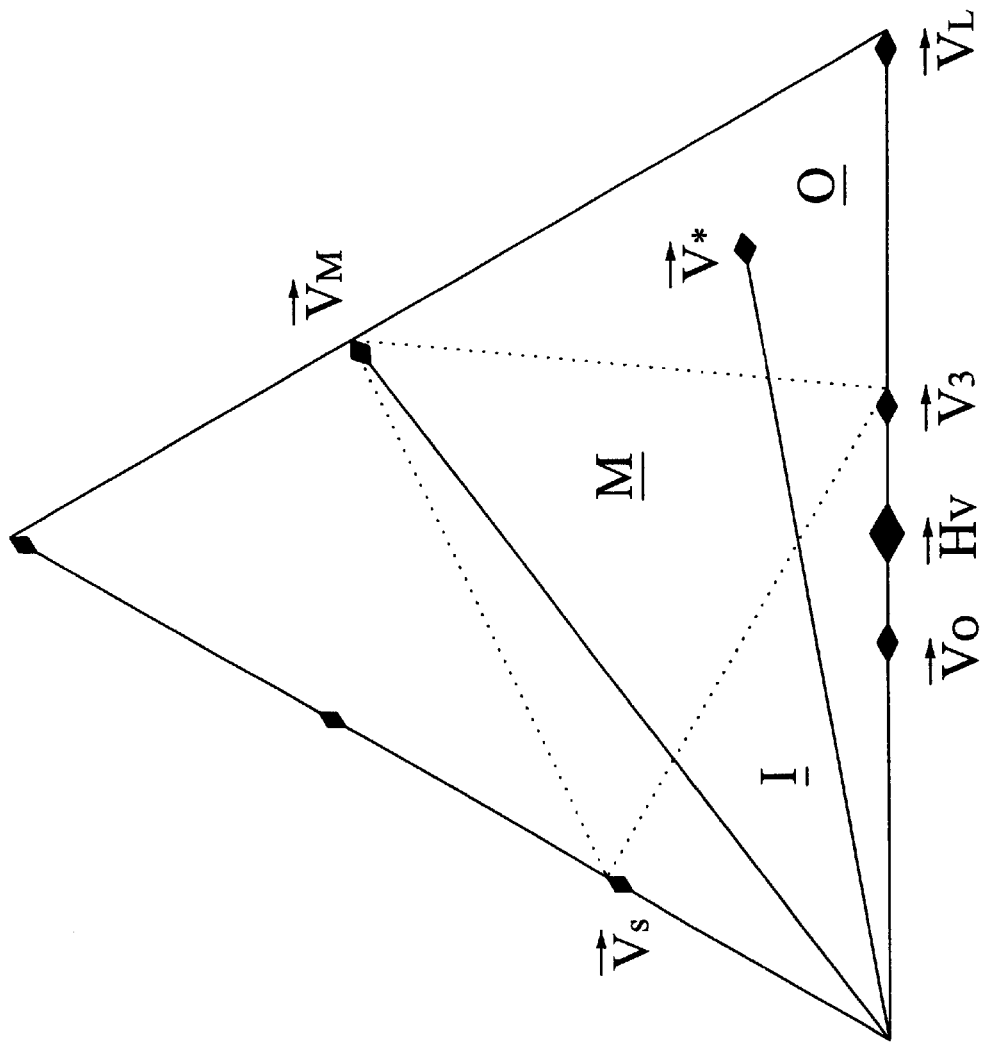
FIG. 10 is a space vector diagram illustrating vectors for use in an example home vertex computation.

FIG. 10 is a space vector diagram illustrating vectors for use in an example home vertex computation in accordance with an embodiment of the present invention. When the neutral point voltage is not exactly balanced (step 108 of FIG. 11), as shown in FIG. 10, instead of using the original home vertex (step 109 at FIG. 11), the new home vertex $\vec{H}v$ can be computed (step 110 of FIG. 11) from a neutral point controller command c and the actual location of the vectors $$\vec{H}v = c \cdot \vec{V}_0 + (1-c) \cdot \vec{V}_3$$

where c∈ [0,1] and represents a relative duty cycle compensation command selected to compensate for an imbalance between the voltages in DC capacitor bank 27 (FIG. 1). In one embodiment, for example, the difference between the DC link voltages $V_p$ and $V_n$ (that is, the error) is fed into a proportional integral regulator (not shown) which provides the compensation command.

Once the "new" home vertexes are calculated, the boundaries between triangular regions can be established (step 111 of FIG. 11) and the nearest three vectors can be found. (step 112 of FIG. 11) FIG. 10 illustrates an embodiment wherein the reference voltage vector $\vec{V}^*$ is located in an outer triangle region O. In that circumstance the duty cycles of the corresponding vectors (step 113 of FIG. 11) are the ones that satisfy the equations $$\vec{V}^* = d_H \cdot \vec{H} + d_M \cdot \vec{V}_M + d_L \cdot \vec{V}_L,$$

$$1 = d_H + d_M + d_L.$$

Wherein $d_H$, $d_M$, and $d_L$ respectively represent the duty cycles of the home, medium, and large switching state vectors, and $\vec{H}$, $\vec{V}_M$, and $\vec{V}_L$ respectively represent the home, medium and large vectors. $\vec{V}_S$ of FIG. 10 represents the small vector.

The small vectors duty cycles can then be found (step 113 of FIG. 11) based on the duty cycle of the home vertex and the neutral point controller command as follows:

$$d_0 = c \cdot d_H,$$

$$d_3 = (1-c) \cdot d_H.$$

When the reference voltage vector $\vec{V}^*$ is located in one of the middle or inner triangle regions (M or I), the algorithm is similar except that that there different vectors to take into account in determining the boundary regions and in performing duty cycle computations.

After the duty cycles are calculated, whether by sine triangular or space vector techniques, controller 24 (FIG. 1) can use the duty cycles to determine gate timings for power electronic switches 14 (step 107 of FIG. 11) and thus minimize effects of neutral point voltage ripple without requiring an increase in DC link capacitance. In one embodiment, the controller is an entirely software based system executed in a computer with interface circuits for voltage and current feedback data acquisition and digital timers for switch activations based on digital signal processor computed timings.

In some situations, the minimum pulse width constraint of the switches results in regions around the sector boundaries (represented by the dashed lines in FIG. 10) that can not be reached by reference voltage vector $\vec{V}^*$ and/or in increased error in small vector $\vec{V}_s$.

In one embodiment of an error compensation technique, the controller is further adapted to calculate a voltage error caused by of a duty cycle time constraint at time n−1. More specifically, the voltage error ($\vec{e}$) can be defined as the difference between the reference voltage vector and the actual vector that was implemented ($\vec{V}_{IMPL}$) as follows:

$$\vec{e}(n-1) = \vec{V}^*(n-1) - \vec{V}_{IMPL}(N-1).$$

The error can then be compensated in the next switching cycle (at time n) if the controller is further adapted to modify a reference voltage vector by adding the voltage error to a command voltage vector ($\vec{V}_{COM}$) as follows:

$$\vec{V}^*(n-1) = \vec{V}^*_{COM}(n-1) + \vec{e}(n-1).$$

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A high power motor drive converter comprising:
   a three level neutral point clamped (NPC) output power conversion stage including switches for supplying power to an AC drive motor;
   a split series connected DC capacitor bank coupled in parallel with the NPC output power conversion stage; and
   a controller for selecting switch positions for controlling the NPC output power conversion stage and compensating for a neutral point voltage imbalance of the DC capacitor bank by adjusting amplitudes of carrier voltages according to an amount of voltage imbalance in the split series connected DC capacitor bank, wherein the controller is adapted for adjusting the amplitudes by using a ratio of DC voltages across the DC capacitor bank.

2. The converter of claim 1 wherein the ratio is calculated as follows:

$$\frac{K_p}{K_n} = \frac{|V_p|}{|V_n|}$$

wherein $K_p + K_n$ = a constant, $|V_p| + |V_n| = V_{dc}$, $V_{dc}$ represents DC bus voltage, $V_p$ represents positive rail DC bus voltage, and $V_n$ represents negative rail DC bus voltage.

3. The converter of claim 2 wherein the controller is adapted for adjusting the amplitudes by calculating modulating signals for each phase x as follows:

$$v_a(t) = m \cdot \sin(\omega \cdot t) + m_0$$

$$v_b(t) = m \cdot \sin\left(\omega \cdot t - \frac{2 \cdot \pi}{3}\right) + m_0$$

$$v_c(t) = m \cdot \sin\left(\omega \cdot t + \frac{2 \cdot \pi}{3}\right) + m_0$$

wherein $v_a(t)$, $v_b(t)$, $v_c(t) \in [0,2]$, m represents a modulation index, $m_0$ represents the zero sequence component, ω represents frequency, and t represents time.

4. A method of controlling a high power motor drive converter including a three level neutral point clamped (NPC) output power conversion stage including switches for supplying power to an AC drive motor and a split series connected DC capacitor bank coupled in parallel with the NPC output power conversion stage, the method comprising: selecting switch positions for controlling the NPC output power conversion stage and compensating for a neutral point voltage imbalance of the DC capacitor bank by adjusting amplitudes of carrier voltages according to an amount of voltage imbalance in the split series connected DC capacitor bank, wherein adjusting the amplitudes comprises using a ratio of DC voltages across the DC capacitor bank.

5. The method of claim 4 wherein the ratio is calculated as follows:

$$\frac{K_p}{K_n} = \frac{|V_p|}{|V_n|}$$

wherein $K_p + K_n$ = a constant, $|V_p| + |V_n| = V_{dc}$, $V_{dc}$ represents DC bus voltage, $V_p$ represents positive rail DC bus voltage, and $V_n$ represents negative rail DC bus voltage.

6. The method of claim 5 wherein adjusting the amplitudes comprises calculating modulating signals for each phase x as follows:

$$v_a(t) = m \cdot \sin(\omega \cdot t) + m_0$$
$$v_b(t) = m \cdot \sin\left(\omega \cdot t - \frac{2 \cdot \pi}{3}\right) + m_0$$
$$v_c(t) = m \cdot \sin\left(\omega \cdot t + \frac{2 \cdot \pi}{3}\right) + m_0$$

wherein $v_a(t), v_b(t), v_c(t) \in [0,2]$, m represents a modulation index, $m_0$ represents the zero sequence component, $\omega$ represents frequency, and t represents time.

7. A high power motor drive converter comprising:

a three level neutral point clamped (NPC) output power conversion stage including switches for supplying power to an AC drive motor;

a split series connected DC capacitor bank coupled in parallel with the NPC output power conversion stage; and a controller for selecting switch positions for controlling the NPC output power conversion stage and compensating for a neutral point voltage imbalance of the DC capacitor bank by adjusting amplitudes of carrier voltages according to an amount of voltage imbalance in the split series connected DC capacitor bank, wherein the controller is adapted for adjusting the amplitudes by using a ratio of DC voltages across the DC capacitor bank, wherein the ratio is calculated as follows:

$$\frac{K_p}{K_n} = \frac{|V_p|}{|V_n|}$$

wherein $K_p + K_n$ = a constant, $|V_p| + |V_n| = V_{dc}$, $V_{dc}$ represents DC bus voltage, $V_p$ represents positive rail DC bus voltage, and $V_n$ represents negative rail DC bus voltage, wherein the controller is adapted for adjusting the amplitudes by calculating modulating signals for each phase x as follows:

$$v_a(t) = m \cdot \sin(\omega \cdot t) + m_0$$
$$v_b(t) = m \cdot \sin\left(\omega \cdot t - \frac{2 \cdot \pi}{3}\right) + m_0$$
$$v_c(t) = m \cdot \sin\left(\omega \cdot t + \frac{2 \cdot \pi}{3}\right) + m_0$$

wherein $v_a(t), v_b(t), v_c(t) \in [0,2]$, m represents a modulation index, $m_0$ represents the zero sequence component, $\omega$ represents frequency, and t represents time, and wherein the controller is adapted for adjusting the amplitudes by using the ratio and the modulating signals for each phase x to calculate switch position duty cycles as follows:

$$\langle d_p(t) \rangle = \frac{v_x(t) - K_n}{K_p} \text{ and } \langle d_o(t) \rangle = \frac{2 - v_x(t)}{K_p} \text{ for } v_x(t) > K_n, \text{ and}$$

$$\langle d_o(t) \rangle = \frac{v_x(t)}{K_n}, \text{ and } \langle d_n(t) \rangle = \frac{K_n - v_x(t)}{K_n} \text{ for } v_x(t) < K_n.$$

8. A method of controlling a high power motor drive converter including a three level neutral point clamped (NPC) output power conversion stage including switches for supplying power to an AC drive motor and a split series connected DC capacitor bank coupled in parallel with the NPC output power conversion stage, the method comprising: selecting switch positions for controlling the NPC output power conversion stage and compensating for a neutral point voltage imbalance of the DC capacitor bank by adjusting amplitudes of carrier voltages according to an amount of voltage imbalance in the split series connected DC capacitor bank, wherein adjusting the amplitudes comprises using a ratio of DC voltages across the DC capacitor bank, wherein the ratio is calculated as follows:

$$\frac{K_p}{K_n} = \frac{|V_p|}{|V_n|}$$

wherein $K_p + K_n$ = a constant, $|V_p| + |V_n| = V_{dc}$, $V_{dc}$ represents DC bus voltage, $V_p$ represents positive rail DC bus voltage, and $V_n$ represents negative rail DC bus voltage, wherein adjusting the amplitudes comprises calculating modulating signals for each phase x as follows:

$$v_a(t) = m \cdot \sin(\omega \cdot t) + m_0$$
$$v_b(t) = m \cdot \sin\left(\omega \cdot t - \frac{2 \cdot \pi}{3}\right) + m_0$$
$$v_c(t) = m \cdot \sin\left(\omega \cdot t + \frac{2 \cdot \pi}{3}\right) + m_0$$

wherein $v_a(t), v_b(t), v_c(t) \in [0,2]$, m represents a modulation index, $m_0$ represents the zero sequence component, $\omega$ represents frequency, and t represents time, wherein adjusting the amplitudes comprises using the ratio and the modulating signals for each phase x to calculate switch position duty cycles as follows:

$$\langle d_p(t)\rangle = \frac{v_x(t)-K_n}{K_p} \text{ and } \langle d_0(t)\rangle = \frac{2-v_x(t)}{K_p} \text{ for } v_x(t) > K_n, \text{ and}$$

$$\langle d_0(t)\rangle = \frac{v_x(t)}{K_n}, \text{ and } \langle d_n(t)\rangle = \frac{K_n - v_x(t)}{K_n} \text{ for } v_x(t) < K_n.$$

9. A high power motor drive converter comprising:

a three level neutral point clamped (NPC) output power conversion stage including switches for supplying power to an AC drive motor;

a split series connected DC capacitor bank coupled in parallel with the NPC output power conversion stage; and a controller for selecting switch positions for controlling the NPC output power conversion stage and compensating for a neutral point voltage imbalance of the DC capacitor bank by using space vector analysis to calculate switch position duty cycles based on actual locations of voltage vectors to adjust amplitudes of carrier voltages according to an amount of voltage imbalance in the split series connected DC capacitor bank.

10. The converter of claim 9 wherein the controller is adapted for calculating a new home vertex in response to a voltage unbalance in the DC capacitor bank.

11. The converter of claim 10 wherein the controller is adapted for using the new home vertex to calculate a home vertex duty cycle and using the small vertex duty cycle to calculate the small vector duty cycles.

12. The converter of claim 11 wherein the controller is further to calculate a voltage error caused by of a duty cycle time constraint at time n−1.

13. The converter of claim 12 wherein the controller is further adapted to modify a reference voltage vector by adding the voltage error to a command voltage vector.

14. A method of controlling a high power motor drive converter including a three level neutral point clamped (NPC) output power conversion stage including switches for supplying power to an AC drive motor and a split series connected DC capacitor bank coupled in parallel with the NPC output power conversion stage, the method comprising: selecting switch positions for controlling the NPC output power conversion stage and compensating for a neutral point voltage imbalance of the DC capacitor bank by adjusting amplitudes of carrier voltages according to an amount of voltage imbalance in the split series connected DC capacitor bank, wherein adjusting the amplitudes comprises using space vector analysis to calculate switch position duty cycles based on actual locations of voltage vectors.

15. The method of claim 14 wherein using space vector analysis comprises calculating a new home vertex in response to a voltage unbalance in the DC capacitor bank.

16. The method of claim 15 wherein using space vector analysis further comprises using the new home vertex to calculate a home vertex duty cycle and using the small vertex duty cycle to calculate the small vector duty cycles.

17. The method of claim 16 wherein adjusting the amplitudes further comprises calculating a voltage error caused by of a duty cycle time constraint at time n−1.

18. The method of claim 17 wherein adjusting the amplitudes further comprises modifying a reference voltage vector by adding the voltage error to a command voltage vector.

* * * * *

UNITED STATES PATENT AND TRADEMARK OFFICE
CERTIFICATE OF CORRECTION

PATENT NO. : 6,534,949 B2
DATED : March 18, 2003
INVENTOR(S) : Szczesny et al.

It is certified that error appears in the above-identified patent and that said Letters Patent is hereby corrected as shown below:

<u>Column 7,</u>
Lines 15 and 55, please delete the equation shown and insert the following equation:

$$\frac{K_p}{K_n} = \frac{|V_p|}{|V_n|}$$

Signed and Sealed this

Third Day of February, 2004

JON W. DUDAS
*Acting Director of the United States Patent and Trademark Office*